(12) United States Patent
Sweeney

(10) Patent No.: US 10,946,821 B2
(45) Date of Patent: *Mar. 16, 2021

(54) CONFIGURATION OF VEHICLE COMPARTMENTS

(71) Applicant: UATC, LLC, San Francisco, CA (US)

(72) Inventor: Matthew Sweeney, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 16/152,657

(22) Filed: Oct. 5, 2018

(65) Prior Publication Data
US 2020/0108785 A1 Apr. 9, 2020
US 2020/0231106 A9 Jul. 23, 2020

Related U.S. Application Data

(63) Continuation of application No. 15/674,377, filed on Aug. 10, 2017, now Pat. No. 10,118,577.

(51) Int. Cl.
*B60R 16/03* (2006.01)
*G01C 21/34* (2006.01)
*B60R 16/037* (2006.01)
*G05D 1/02* (2020.01)

(52) U.S. Cl.
CPC ........ *B60R 16/037* (2013.01); *G01C 21/3492* (2013.01); *G05D 1/0223* (2013.01); *G05D 2201/0212* (2013.01)

(58) Field of Classification Search
CPC .. B60R 16/03; G01C 21/3492; G05D 1/0223; G05D 2201/0212
USPC .......................................................... 701/23
See application file for complete search history.

(56) References Cited

U.S. PATENT DOCUMENTS

| 7,164,117 B2 | 1/2007 | Breed et al. |
| 2006/0180371 A1 | 8/2006 | Breed et al. |
| 2006/0208169 A1 | 9/2006 | Breed et al. |
| 2018/0372504 A1* | 12/2018 | Singhal .............. G01C 21/3492 |

* cited by examiner

*Primary Examiner* — Tan Q Nguyen
(74) *Attorney, Agent, or Firm* — Dority & Manning, P.A.

(57) ABSTRACT

Systems, methods, tangible, non-transitory computer-readable media, and devices for configuration of a vehicle compartment are provided. For example, a method can include receiving, by a computing system, occupancy data based in part on one or more states of one or more objects. Based in part on the occupancy data and compartment data, a compartment configuration can be determined for one or more compartments of an autonomous vehicle. The compartment data can be based in part on a state of the one or more compartments. The compartment configuration can specify one or more spatial relations of one or more compartment components associated with the one or more compartments. One or more configuration signals can be generated based in part on the compartment configuration to control the one or more compartments of the autonomous vehicle.

20 Claims, 6 Drawing Sheets

CONFIGURATION OF VEHICLE COMPARTMENTS

RELATED APPLICATION

The present application is based on and claims benefit of U.S. application Ser. No. 15/674,377 having a filing date of Aug. 10, 2017, which is incorporated by reference herein.

FIELD

The present disclosure relates generally to operation of an autonomous vehicle, which can be based on a configuration of compartments of the autonomous vehicle.

BACKGROUND

Vehicles, including autonomous vehicles, can include a variety of vehicle control systems that can be used to perform various functions. The vehicle control systems can be coupled with a variety of sensors that facilitate performance of these functions by the autonomous vehicle. However, the functions that an autonomous vehicle is expected to perform can change, sometimes within a short time-frame. As such, there exists a need for an autonomous vehicle that is able to more effectively perform those functions by adapting to its environment and the demands placed upon the autonomous vehicle by that environment and its users.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of operating an autonomous vehicle. The computer-implemented method of operating an autonomous vehicle can include receiving, by a computing system comprising one or more computing devices, occupancy data based in part on one or more states of one or more objects. The method can also include determining, based in part on the occupancy data and compartment data, a compartment configuration for one or more compartments of an autonomous vehicle. The compartment data can be based in part on a state of the one or more compartments. The compartment configuration can specify one or more spatial relations of one or more compartment components associated with the one or more compartments. The method can also include generating, by the computing system, one or more configuration signals based in part on the compartment configuration to control the one or more compartments of the autonomous vehicle.

Another example aspect of the present disclosure is directed to one or more tangible, non-transitory computer-readable media storing computer-readable instructions that when executed by one or more processors cause the one or more processors to perform operations. The operations can include receiving occupancy data based in part on one or more states of one or more objects. The method can also include determining, based in part on the occupancy data and compartment data, a compartment configuration for one or more compartments of an autonomous vehicle. The compartment data can be based in part on a state of the one or more compartments. The compartment configuration can specify one or more spatial relations of one or more compartment components associated with the one or more compartments. The method can also include generating one or more configuration signals based in part on the compartment configuration to control the one or more compartments of the autonomous vehicle.

Another example aspect of the present disclosure is directed to an autonomous vehicle comprising one or more processors and one or more non-transitory computer-readable media storing instructions that when executed by the one or more processors cause the one or more processors to perform operations. The operations can include receiving occupancy data based in part on one or more states of one or more objects. The method can also include determining, based in part on the occupancy data and compartment data, a compartment configuration for one or more compartments of an autonomous vehicle. The compartment data can be based in part on a state of the one or more compartments. The compartment configuration can specify one or more spatial relations of one or more compartment components associated with the one or more compartments. The method can also include generating one or more configuration signals based in part on the compartment configuration to control the one or more compartments of the autonomous vehicle.

Other example aspects of the present disclosure are directed to other systems, methods, vehicles, apparatuses, tangible non-transitory computer-readable media, and devices for configuration of a vehicle compartment. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
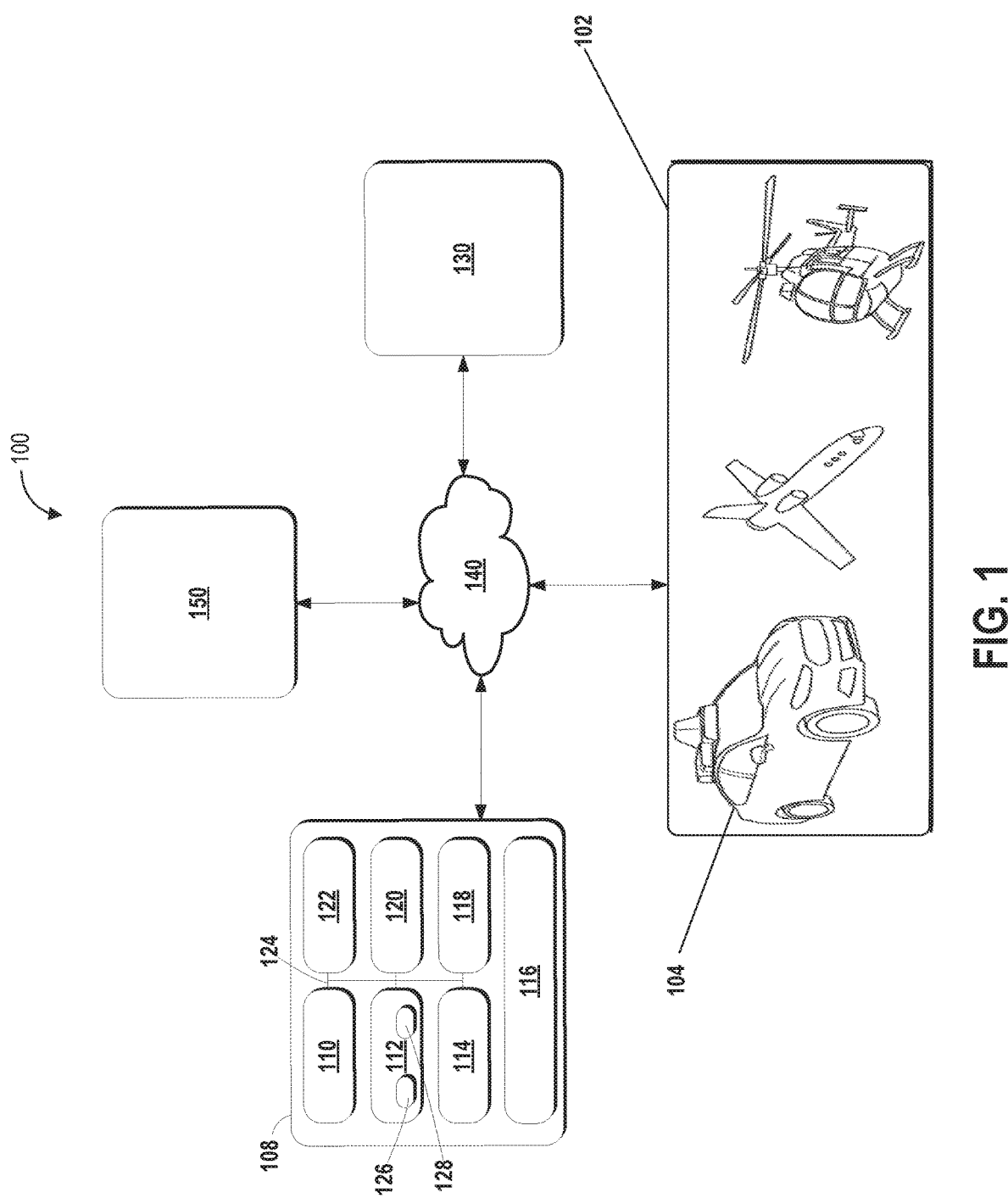
FIG. 1 depicts an example system according to example embodiments of the present disclosure.

Example aspects of the present disclosure are directed at configuring one or more compartments (e.g., a passenger cabin or cargo storage areas) of a vehicle (e.g., an autonomous vehicle, a semi-autonomous vehicle, or a manually operated vehicle) based on the state of one or more objects (e.g., passengers or cargo) associated with the vehicle. The vehicle can receive data including occupancy data associated with one or more states (e.g., mass, weight, volume, or physical dimensions) of one or more objects, determine a compartment configuration (e.g., a physical arrangement of one or more compartment components that make up the compartments), and activate one or more vehicle control systems to modify the position or location of the one or more compartment components. As such, the disclosed technology can better accommodate a variety of objects inside the vehicle's compartments. In particular, the disclosed technology facilitates more efficient use of available compartment space and improves operation of the vehicle through better distribution (e.g., mass distribution throughout the vehicle compartments) and more secure compartmentalization of the one or more objects (e.g., less shifting of cargo during transit).

By way of example, the vehicle can receive occupancy data from a combination of sensors on the vehicle (e.g., optical sensors on the vehicle) and remote computing devices (e.g., mobile computing devices). The occupancy data can indicate that food items (i.e. the one or more objects) including hot food (e.g., soup) and cold food (e.g., ice cream) are to be picked up and loaded into the vehicle. Compartment data indicates that the passenger compartment of the vehicle is occupied and that space for the food items is available in compartments located in the storage compartment (e.g., trunk) of the vehicle. Based on the states (temperatures) of the food items, the vehicle can configure the one or more compartment components of the storage compartment so that an insulating barrier component is positioned between the hot food and the cold food. In this way, the compartment can be configured to better accommodate the different food items by separating them with a compartment component (i.e., the insulating barrier component) that assists in maintaining their respective temperatures.

The vehicle can include one or more systems including a vehicle computing system or vehicle control system that can control a variety of vehicle systems and components including the one or more compartment components (e.g., components that can be positioned to form different shapes or create one or more barriers between vehicle compartments or portions of an individual vehicle compartment), a feedback system to receive feedback on the positioning of passengers or cargo within the vehicle, and a navigation system that can adjust the configuration of the compartment based on the predicted position of the vehicle at a destination location.

The vehicle control system can process, generate, or exchange (send or receive) signals or data, including signals or data exchanged with various vehicle systems, vehicle components, or remote computing systems. For example, the vehicle control system can exchange signals or data with vehicle systems including vehicle compartment systems (e.g., electronic, mechanical, or electromechanical systems that are used to control access to or change the position or location of vehicle compartment components); sensor systems (e.g., sensors that generate output based on the state of the physical environment, including optical sensors, audio sensors, or tactile sensors); communication systems (e.g., wired or wireless communication systems); navigation systems (e.g., GPS, GLONASS, or other systems used to determine a vehicle's location); notification systems (e.g., devices used to provide notifications to users including display devices, status lights, or speaker systems); and/or propulsion systems (e.g., engines including electric engines or internal combustion engines).

The vehicle control system can receive occupancy data based in part on one or more states or conditions of one or more objects including current passengers or cargo (e.g., passengers or cargo currently occupying the one or more vehicle compartments) or anticipated passengers or cargo (e.g., passengers or cargo waiting to occupy the one or more vehicle compartments). The occupancy data can be based on various aspects of the one or more objects including physical properties or identifiers associated with the one or more objects. The physical properties associated with the one or more objects can include the physical dimensions (e.g., height, width, depth, mass, weight, volume, texture, odor, and/or temperature). The identifiers associated with the occupancy data can include various identifiers associated with the one or more objects including physical property identifiers (e.g., an identifier that an object is perishable or fragile) or names (e.g., personal names of passengers). Furthermore, the occupancy data can be based on outputs from various devices or systems including vehicle systems (e.g., sensor systems in the vehicle) or systems external to the vehicle (e.g., remote computing systems).

The occupancy data based on vehicle systems (e.g., systems that are part of the vehicle) can include sensor output received from one or more sensors located in the vehicle or external to the vehicle. The sensors can detect the state (e.g., physical features including dimensions) of the environment or objects inside the vehicle (e.g., the state of vehicle compartments and vehicle compartment contents) and outside the vehicle (e.g., the state of passengers or cargo external to the vehicle), and can include an optical sensor (e.g., photoelectric sensors), an audio sensor (e.g., microphone), a pressure sensor, a mass sensor, a weight sensor, a tactile sensor, a temperature sensor, an olfactory sensor (e.g., a sensor that detects scents), and/or an electromagnetic sensor (e.g., capacitive sensors). The sensor output (e.g., sensor data or sensor signals) can be associated with physical characteristics including a mass, a weight, a volume, a size, a shape, a temperature (e.g., a temperature of an object or a portion of an object), a scent (e.g., an indicator of the extent to which an object is odiferous), and/or a texture (e.g., an indicator of whether an object is smooth or rough) of the one or more objects.

The occupancy data received from systems external to the vehicle can include data from remote server systems; distributed computing systems (e.g., cloud computing systems); or personal computing devices (e.g., mobile computing devices). For example, a remote computing device at a shipment dispatch center can send data including a cargo identifier (e.g., the type of cargo), cargo size (e.g., dimensions), and a weight of the cargo that is waiting to be loaded into the one or more vehicle compartments. Further, the vehicle control system can exchange data through a human-computer interface system that can receive input related to the identity, characteristics, or features of the one or more objects. For example, the vehicle can include a graphical user interface that can be used to input a type of cargo (e.g., perishables or non-perishables) and properties of the cargo (e.g., size and mass) that will be loaded into the one or more vehicle compartment.

The vehicle control system can determine a compartment configuration (e.g., a spatial arrangement of one or more compartment components in the vehicle) that can be used to change the state of the one or more compartments including creating or modifying boundaries for the one or more compartments (e.g., portions of the one or more vehicle compartments that the one or more objects can occupy) of the vehicle. The compartment configuration can be based in part on the occupancy data (e.g., data associated with the state of the one or more objects) and/or compartment data that includes a state of the one or more compartments (e.g., physical dimensions of the one or more compartments, or whether the one or more compartments are occupied).

The compartment configuration can specify one or more spatial relations of the one or more compartment components. The one or more spatial relations can include the location, position, or orientation of the one or more compartment components in relation to a portion of the vehicle (e.g., a distance or orientation of the one or more compartment components relative to a location on another component of the vehicle). In this way, the compartment configuration can, depending on the state of the one or more objects and/or the state of the one or more compartments, specify a configuration of the one or more compartment components that can accommodate some portion, or all, of the one or more objects.

In some implementations, the compartment configuration can be based in part on a set of spatial configurations (e.g., spatial configurations of the one or more compartment components that can accommodate the one or more objects) selected from a plurality of spatial configurations. The vehicle control system can determine a plurality of spatial configurations of the one or more objects with respect to the one or more compartments. The plurality of spatial configurations can be based in part on the occupancy data and/or the compartment data. The vehicle control system can determine the plurality of spatial configurations based on multiple comparisons between the dimensions of cargo and the dimensions of the one or more compartments using different configurations of the one or more compartment components. For example, a vehicle with two compartments and a single compartment component can include two compartment configurations, a first configuration with the compartment component positioned to create a barrier between the two compartments, and a second configuration with the compartment component positioned to allow free movement of objects across both compartments.

In some implementations, the compartment data can be based in part on a set of available configurations of the one or more compartment components. For example, compartment data can include an indication of the one or more compartments that are not occupied by passengers or cargo. The vehicle control system can determine a set of available configurations that is based in part on the plurality of spatial configurations that satisfy one or more compartment criteria associated with a location or position of the one or more objects within the one or more compartments (e.g., passengers seated within the passenger compartment and/or cargo stored in a storage compartment). The one or more compartment criteria can include criteria associated with various properties of the one or more objects in relation to the one or more compartments including maximum allowable dimensions (e.g., a maximum length of an object that a compartment can contain) and maximum mass capacity (e.g., a maximum mass of an object that a compartment can bear).

In some implementations, the compartment data can be based in part on a set of available compartments that can be associated with one or more object types (e.g., a category of the object based on states or characteristics of the object or external data associated with the object). The vehicle control system can determine, based in part on the occupancy data, one or more object types for the one or more objects. The determination of the one or more object types can be performed using any combination of output from the one or more sensors (e.g., facial recognition of a passenger based on output from an optical sensor), one or more vehicle computing systems (e.g., an indication of an object type entered into a user interface of the vehicle), and/or data received from a remote computing device (e.g., an indication of an object type received from a remote server computing device). The one or more object types can be based on various states, features, or characteristics of the one or more objects and can include passengers (e.g., individuals waiting to enter the vehicle), perishable cargo (e.g., cargo, such as milk, that will rapidly spoil or decay when stored outside of a naturally cold or refrigerated environment for a pre-determined period of time), non-perishable cargo (e.g., cargo, such as oats, that will not rapidly spoil or decay when stored outside of a naturally cold or refrigerated environment for a pre-determined period of time), and/or durable cargo (e.g., cargo, such as steel or bricks, that does not spoil).

The vehicle control system can then determine the set of available compartments that can include the one or more compartments that satisfy one or more compartment criteria associated with the one or more objects. For example, a storage compartment (e.g., a trunk) can include one or more compartment criteria that preclude the trunk from being available to a passenger.

In some implementations, the compartment data can be based in part on one or more access regulations of the one or more compartments. The one or more access regulations can be associated with limiting contact (e.g., a barrier positioned to separate a pair of the one or more objects) or maintaining a distance (e.g., maintaining a maximum or minimum distance), between the one or more objects. The compartment configuration can be based in part on the one or more access regulations. The one or more access regulations can include an access regulation limiting contact between a passenger and cargo (e.g., a minimum distance between passengers and perishable cargo). For example, the one or more access regulations can include a requirement that a compartment component forms a barrier between a passenger and certain types of cargo (e.g., a cactus or other sharp object). The vehicle can then implement the compartment configuration by modifying the position of a compartment component to form the barrier between the passenger and cargo.

In some implementations, the compartment data can be based in part on the orientation or position of the autonomous vehicle at a destination location (e.g., a location at which the autonomous vehicle will pick-up or drop-off one or more objects). The vehicle control system can determine a time of day or date that the autonomous vehicle is scheduled to arrive at a destination location. Based on navigation data (e.g., data including a map of an area and coordinates to the destination location), an orientation (e.g., the direction in which the vehicle is aligned relative to its surrounding environment) or position (e.g., a latitude and longitude) of the autonomous vehicle at the destination location can be determined. Additionally, the navigation data can include traffic flow patterns associated with an area including the destination location. For example, the navigation data can include indications of the prevailing direction of traffic in an area within a predetermined distance of the destination location.

The vehicle control system can generate one or more signals (e.g., electronic signals) comprising configuration data that can be based in part on the compartment configuration. The one or more configuration signals can include information associated with the compartment configuration. For example, the vehicle control system can generate one or more configuration signals that are transmitted wirelessly from an antenna in the vehicle. In another example, the vehicle control system can generate one or more configuration signals that are transmitted via a wired connection to one or more compartment components of the vehicle. The one or more configuration signals can be received by various vehicle devices or remote computing devices external to the vehicle, that can perform actions associated with the compartment configuration (e.g., modifying the spatial relations of the one or more compartment components).

In an implementation, the vehicle control system can activate one or more vehicle control systems, including compartment systems associated with the one or more compartment components, to modify the one or more spatial relations of the one or more compartment components. The modifications to the one or more compartment components can be based in part on the one or more configuration signals, including the compartment configuration. For example, the vehicle control system can send signals or configuration data to the one or more compartment components or systems associated with the one or more compartment components. The one or more configuration signals can be used to activate devices (e.g., motors of the one or more compartment components) that can move the one or more compartment components into different locations, positions, or orientations.

In another implementation, the vehicle control system can generate compartment modification data that can be based in part on the one or more configuration signals. The compartment modification data can include one or more instructions for performing one or more modifications to the one or more spatial relations of the one or more compartment components. For example, the compartment modification data can include a set of indications (e.g., text or pictures) that can be used by a passenger to manually adjust the position of the one or more compartment components in accordance with the compartment configuration. The vehicle control system can also send the compartment modification data to a variety of remote computing devices including server computing devices, and/or mobile computing devices (e.g., mobile telephones, tablet computing devices, or laptop computers).

Modifying the one or more spatial relations of the one or more compartment components can include modifying the size, shape, position, location, or orientation of the one or more compartment components. Further, modifying the one or more spatial relations of the one or more compartment components can include attaching or detaching a portion of the one or more compartment components from the autonomous vehicle (e.g., temporarily or permanently removing some of the one or more compartment components).

The vehicle control system can generate, based on the occupancy data or the compartment configuration, one or more placement cues to indicate a location to place the one or more objects within the one or more compartments. The one or more placement cues can include visual cues (e.g., illuminated portions of the one or more compartment components), auditory cues (e.g., audio instructions or sound tones), or haptic cues (e.g., portions of the one or more compartment components can vibrate to indicate that an object should not be placed in that location). For example, the vehicle control system can activate lights located in a compartment to indicate that cargo should be placed in that compartment.

The vehicle control system can receive feedback data associated with the one or more objects or the one or more compartments. The feedback data can be associated with any state or condition of the one or more compartments including an indication of an adverse effect on the operation of the one or more compartments or the autonomous vehicle. For example, a passenger in the vehicle can provide feedback in the form of an indication that one of the compartment components is damaged or is stuck in a position that prevents a vehicle door from closing. The vehicle control system can then update the compartment data (e.g., store or modify compartment data on a storage device) based in part on the feedback data. Further, based on feedback that a compartment component is damaged, the compartment data can be updated to indicate the status (e.g., the compartment component is damaged but still partly functional) of the damaged compartment component.

To increase the safety of transporting passengers or cargo, the vehicle control system can modify operation of the autonomous vehicle based in part on the compartment configuration. The modifications to the operation of the autonomous vehicle can include modifying a velocity of the autonomous vehicle (e.g., a maximum velocity at which the autonomous vehicle will travel), an acceleration of the autonomous vehicle (e.g., a maximum rate of acceleration for the autonomous vehicle), a deceleration of the autonomous vehicle (e.g., a braking profile that the autonomous vehicle can use to maintain its deceleration within a defined deceleration range), or a path of the autonomous vehicle (e.g., a path that the vehicle can travel based on the type of cargo in the one or more compartments). For example, the vehicle can avoid sudden acceleration or deceleration when the one or more compartments are occupied by very fragile cargo.

The systems, methods, and devices in the disclosed technology can provide a variety of technical effects and benefits to the overall operation of the vehicle and configuration of the one or more compartments in particular. The disclosed technology can modify the configuration of one or more compartments of the vehicle in a way that improves the safety of the vehicle. For example, modifying one or more compartment components of the vehicle (e.g., erecting barriers within a vehicle compartment) can ensure that passengers are safely separated from cargo. Further, the safety of the vehicle can be improved through a compartment configuration that secures passengers or cargo so that their movement during transit is minimized.

The disclosed technology can also improve the operation of the vehicle by generating a compartment configuration that distributes the one or more objects more optimally throughout the one or more compartments. For example, heavier objects can be interspersed with lighter objects in a way that spreads the weight of the load throughout the one or more compartments and can result in less wear and tear on vehicle components as well as better vehicle handling.

Furthermore, the flexibility of the compartment configurations in the disclosed technology can result in more efficient use of space in the one or more compartments. For example, the one or more compartments can be resized in such a way that a mixture of small and large objects can be accommodated with minimal shifting of the one or more objects during transit.

Accordingly, the disclosed technology provides more effective configuration of a vehicle's compartments along with operational benefits including improved vehicle safety, enhanced vehicle longevity, and greater efficiency in terms of load distribution and compartment space utilization.

With reference now to FIGS. 1-6, example embodiments of the present disclosure will be discussed in further detail. FIG. 1 depicts a diagram of an example system 100 according to example embodiments of the present disclosure. The system 100 can include a plurality of vehicles 102; a vehicle 104; a vehicle computing system 108 that includes one or more computing devices 110; one or more data acquisition systems 112; an autonomy system 114; one or more control systems 116; one or more human machine interface systems 118; other vehicle systems 120; a communications system 122; a network 124; one or more image capture devices 126; one or more sensors 128; one or more remote computing devices 130; a communication network 140; and an operations computing system 150.

The operations computing system 150 can be associated with a service provider that provides one or more vehicle services to a plurality of users via a fleet of vehicles that includes, for example, the vehicle 104. The vehicle services can include transportation services (e.g., rideshare services), courier services, delivery services, and/or other types of services.

The operations computing system 150 can include multiple components for performing various operations and functions. For example, the operations computing system 150 can include and/or otherwise be associated with one or more remote computing devices that are remote from the vehicle 104. The one or more remote computing devices can include one or more processors and one or more memory devices. The one or more memory devices can store instructions that when executed by the one or more processors cause the one or more processors to perform operations and functions associated with operation of the vehicle including determination of the state of one or more objects inside and external to the vehicle, and comparison of the state of the one or more objects to the state of one or more vehicle compartments that include one or more vehicle compartment components.

For example, the operations computing system 150 can be configured to monitor and communicate with the vehicle 104 and/or its users to coordinate a vehicle service provided by the vehicle 104. To do so, the operations computing system 150 can manage a database that includes data including vehicle status data associated with the status of vehicles including the vehicle 104. The vehicle status data can include a location of the plurality of vehicles 102 (e.g., a latitude and longitude of a vehicle), the availability of a vehicle (e.g., whether a vehicle is available to pick-up or drop-off passengers or cargo), or the compartment configuration of a vehicle (e.g., the spatial relationships between one or more compartment components of the vehicle).

An indication, record, and/or other data indicative of the state of the one or more objects or the compartment configuration of the vehicle 104 can be stored locally in one or more memory devices of the vehicle 104. Additionally, or alternatively, the vehicle 104 can provide data indicative of the state of the one or more objects or the compartment configuration of the vehicle 104 to the operations computing system 150, which can store an indication, record, and/or other data indicative of the state of the one or more objects or the compartment configuration of the vehicle 104 in one or more memory devices associated with the operations computing system 150 (e.g., remote from the vehicle).

The operations computing system 150 can communicate with the vehicle 104 via one or more communications networks including the communications network 140. The communications network 140 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 140 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 104.

The vehicle 104 can be a ground-based vehicle (e.g., an automobile), an aircraft, and/or another type of vehicle. The vehicle 104 can be an autonomous vehicle that perform actions including driving, navigating, operating, with minimal and/or no interaction from a human driver. The autonomous vehicle 104 can be configured to operate in one or more modes including, for example, a fully autonomous operational mode, a semi-autonomous operational mode, a park mode, or a sleep mode. A fully autonomous (e.g., self-driving) operational mode can be one in which the vehicle 104 can provide driving and navigational operation with minimal and/or no interaction from a human driver present in the vehicle. A semi-autonomous operational mode can be one in which the vehicle 104 can operate with some interaction from a human driver present in the vehicle. Park and/or sleep modes can be used between operational modes while the vehicle 104 waits to provide a subsequent vehicle service, recharges between operational modes.

The vehicle 104 can include a vehicle computing system 108. The vehicle computing system 108 can include various components for performing various operations and functions. For example, the vehicle computing system 108 can include one or more computing devices 110 on-board the vehicle 104. The one or more computing devices 110 can include one or more processors and one or more memory devices, each of which are on-board the vehicle 104. The one or more memory devices can store instructions that when executed by the one or more processors cause the one or more processors to perform operations and functions, such as those taking the vehicle 104 out-of-service, stopping the motion of the vehicle 104, determining the compartment configuration of the vehicle 104, or generating indications associated with the loading or unloading of passengers or cargo to the vehicle 104, as described herein.

The one or more computing devices 110 can implement, include, and/or otherwise be associated with various other systems on-board the vehicle 104. The one or more computing devices 110 can be configured to communicate with these other on-board systems of the vehicle 104. For instance, the one or more computing devices 110 can be configured to communicate with one or more data acquisition systems 112, an autonomy system 114 (e.g., including a navigation system), one or more control systems 116, one or more human machine interface systems 118, other vehicle systems 120, and/or a communications system 122. The one or more computing devices 110 can be configured to communicate with these systems via a network 124. The network 124 can include one or more data buses (e.g., controller area network (CAN)), on-board diagnostics connector (e.g., OBD-II), and/or a combination of wired and/or wireless communication links. The one or more computing devices 110 and/or the other on-board systems can send and/or receive data, messages, signals, or other information amongst one another via the network 124.

The one or more data acquisition systems 112 can include various devices configured to acquire data associated with the vehicle 104. This can include data associated with one or more of the vehicle's systems (e.g., health data), the vehicle's interior, the vehicle's exterior, the vehicle's surroundings, and/or the vehicle users. The one or more data acquisition systems 112 can include, for example, one or more image capture devices 126. The one or more image capture devices 126 can include one or more cameras, LIDAR systems), two-dimensional image capture devices, three-dimensional image capture devices, static image capture devices, dynamic (e.g., rotating) image capture devices, video capture devices (e.g., video recorders), lane detectors, scanners, optical readers, electric eyes, and/or other suitable types of image capture devices. The one or more image capture devices 126 can be located in the interior and/or on the exterior of the vehicle 104. The one or more image capture devices 126 can be configured to acquire image data to be used for operation of the vehicle 104 in an autonomous mode. For example, the one or more image capture devices 126 can acquire image data to allow the vehicle 104 to implement one or more machine vision techniques (e.g., to detect objects in the surrounding environment).

Additionally, or alternatively, the one or more data acquisition systems 112 can include one or more sensors 128. The one or more sensors 128 can include impact sensors, motion sensors, pressure sensors, mass sensors, weight sensors, volume sensors (e.g., sensors that can determine the volume of an object in liters), temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data indicative of parameters associated with the vehicle 104 and/or relevant to the operation of the vehicle 104. The one or more data acquisition systems 112 can include the one or more sensors 128 dedicated to obtaining data associated with a particular aspect of the vehicle 104, including the vehicle's fuel tank, engine, oil compartment, and/or wipers. The one or more sensors 128 can also, or alternatively, include sensors associated with one or more mechanical and/or electrical components of the vehicle 104. For example, the one or more sensors 128 can be configured to detect whether a vehicle door, trunk, gas cap, or other component is in an open or closed position. In some implementations, the data acquired by the one or more sensors 128 can help detect other vehicles and/or objects, road conditions (e.g., curves, potholes, dips, bumps, changes in grade), measure a distance between the vehicle 104 and other vehicles and/or objects.

The vehicle computing system 108 can also be configured to obtain map data. For instance, a computing device of the vehicle (e.g., within the autonomy system 114) can be configured to receive map data from one or more remote computing device including the operations computing system 150 or the one or more remote computing devices 130 (e.g., associated with a geographic mapping service provider). The map data can include any combination of two-dimensional or three-dimensional geographic map data associated with the area in which the vehicle was, is, or will be travelling.

The data acquired from the one or more data acquisition systems 112, the map data, and/or other data can be stored in one or more memory devices on-board the vehicle 104. The on-board memory devices can have limited storage capacity. As such, the data stored in the one or more memory devices may need to be periodically removed, deleted, and/or downloaded to another memory device (e.g., a database of the service provider). The one or more computing devices 110 can be configured to monitor the memory devices, and/or otherwise communicate with an associated processor, to determine how much available data storage is in the one or more memory devices. Additionally, or alternatively, one or more of the other on-board systems (e.g., the autonomy system 114) can be configured to access the data stored in the one or more memory devices.

The autonomy system 114 can be configured to allow the vehicle 104 to operate in an autonomous mode. For instance, the autonomy system 114 can obtain the data associated with the vehicle 104 (e.g., acquired by the one or more data acquisition systems 112). The autonomy system 114 can also obtain the map data. The autonomy system 114 can control various functions of the vehicle 104 based, at least in part, on the acquired data associated with the vehicle 104 and/or the map data to implement the autonomous mode. For example, the autonomy system 114 can include various models to perceive road features, signage, and/or objects, people, animals, based on the data acquired by the one or more data acquisition systems 112, map data, and/or other data. In some implementations, the autonomy system 114 can include machine-learned models that use the data acquired by the one or more data acquisition systems 112, the map data, and/or other data to help operate the autonomous vehicle. Moreover, the acquired data can help detect other vehicles and/or objects, road conditions (e.g., curves, potholes, dips, bumps, changes in grade, or the like), measure a distance between the vehicle 104 and other vehicles and/or objects. The autonomy system 114 can be configured to predict the position and/or movement (or lack thereof) of such elements (e.g., using one or more odometry techniques). The autonomy system 114 can be configured to plan the motion of the vehicle 104 based, at least in part, on such predictions. The autonomy system 114 can implement the planned motion to appropriately navigate the vehicle 104 with minimal or no human intervention. For instance, the autonomy system 114 can include a navigation system configured to direct the vehicle 104 to a destination location. The autonomy system 114 can regulate vehicle speed, acceleration, deceleration, steering, and/or operation of other components to operate in an autonomous mode to travel to such a destination location.

The autonomy system 114 can determine a position and/or route for the vehicle 104 in real-time and/or near real-time. For instance, using acquired data, the autonomy system 114 can calculate one or more different potential routes (e.g., every fraction of a second). The autonomy system 114 can then select which route to take and cause the vehicle 104 to navigate accordingly. By way of example, the autonomy system 114 can calculate one or more different straight paths (e.g., including some in different parts of a current lane), one or more lane-change paths, one or more turning paths, and/or one or more stopping paths. The vehicle 104 can select a path based, at last in part, on acquired data, current traffic factors, travelling conditions associated with the vehicle 104. In some implementations, different weights can be applied to different criteria when selecting a path. Once selected, the autonomy system 114 can cause the vehicle 104 to travel according to the selected path.

The one or more control systems 116 of the vehicle 104 can be configured to control one or more aspects of the vehicle 104. For example, the one or more control systems 116 can control one or more access points of the vehicle 104. The one or more access points can include features such as the vehicle's door locks, trunk lock, hood lock, fuel tank access, latches, and/or other mechanical access features that can be adjusted between one or more states, positions, and/or locations. For example, the one or more control systems 116 can be configured to control an access point (e.g., door lock) to adjust the access point between a first state (e.g., lock position) and a second state (e.g., unlocked position). Additionally, or alternatively, the one or more control systems 116 can be configured to control one or more other electrical features of the vehicle 104 that can be adjusted between one or more states. For example, the one or more control systems 116 can be configured to control one or more electrical features (e.g., hazard lights, microphone) to adjust the feature between a first state (e.g., off) and a second state (e.g., on).

The one or more human machine interface systems 118 can be configured to allow interaction between a user (e.g., human), the vehicle 104 (e.g., the vehicle computing system 108), and/or a third party (e.g., an operator associated with the service provider). The one or more human machine interface systems 118 can include a variety of interfaces for the user to input and/or receive information from the vehicle computing system 108. For example, the one or more human machine interface systems 118 can include a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces. The one or more human machine interface systems 118 can include one or more input devices (e.g., touchscreens, keypad, touchpad, knobs, buttons, sliders, switches, mouse, gyroscope, microphone, other hardware interfaces) configured to receive user input. The one or more human machine interfaces 118 can also include one or more output devices (e.g., display devices, speakers, lights) to receive and output data associated with the interfaces.

The other vehicle systems 120 can be configured to control and/or monitor other aspects of the vehicle 104. For instance, the other vehicle systems 120 can include software update monitors, an engine control unit, transmission control unit, and/or the on-board memory devices. The one or more computing devices 110 can be configured to communicate with the other vehicle systems 120 to receive data and/or to send to one or more signals. By way of example, the software update monitors can provide, to the one or more computing devices 110, data indicative of a current status of the software running on one or more of the on-board systems and/or whether the respective system requires a software update.

The communications system 122 can be configured to allow the vehicle computing system 108 (and its one or more computing devices 110) to communicate with other computing devices. In some implementations, the vehicle computing system 108 can use the communications system 122 to communicate with one or more user devices over the networks. In some implementations, the communications system 122 can allow the one or more computing devices 110 to communicate with one or more of the systems on-board the vehicle 104. The vehicle computing system 108 can use the communications system 122 to communicate with the operations computing system 150 and/or the one or more remote computing devices 130 over the networks (e.g., via one or more wireless signal connections). The communications system 122 can include any suitable components for interfacing with one or more networks, including for example, transmitters, receivers, ports, controllers, antennas, or other suitable components that can help facilitate communication with one or more remote computing devices that are remote from the vehicle 104.

In some implementations, the one or more computing devices 110 on-board the vehicle 104 can obtain vehicle data indicative of one or more parameters associated with the vehicle 104. The one or more parameters can be based on information including health and maintenance information associated with the vehicle 104, the vehicle computing system 108, and/or one or more of the on-board systems. For example, the one or more parameters can include fuel level, engine conditions, tire pressure, conditions associated with the vehicle's interior, conditions associated with the vehicle's exterior, mileage, time until next maintenance, time since last maintenance, available data storage in the on-board memory devices, a charge level of an energy storage device in the vehicle 104, current software status, needed software updates, and/or other heath and maintenance data of the vehicle 104.

At least a portion of the vehicle data indicative of the parameters can be provided via one or more of the systems on-board the vehicle 104. The one or more computing devices 110 can be configured to request the vehicle data from the on-board systems on a scheduled and/or as-needed basis. In some implementations, one or more of the on-board systems can be configured to provide vehicle data indicative of one or more parameters to the one or more computing devices 110 (e.g., periodically, continuously, as-needed, as requested). By way of example, the one or more data acquisitions systems 112 can provide a parameter indicative of the vehicle's fuel level and/or the charge level in a vehicle energy storage device. In some implementations, one or more of the parameters can be indicative of user input. For example, the one or more human machine interfaces 118 can receive user input (e.g., via a user interface displayed on a display device in the vehicle's interior). The one or more human machine interfaces 118 can provide data indicative of the user input to the one or more computing devices 110. In some implementations, the one or more computing devices 130 can receive input and can provide data indicative of the user input to the one or more computing devices 110. The one or more computing devices 110 can obtain the data indicative of the user input from the one or more computing devices 130 (e.g., via a wireless communication).

The one or more computing devices 110 can be configured to determine the state of the vehicle 104 and the environment around the vehicle 104 including the state of one or more objects including passengers (e.g., individuals inside the vehicle or waiting to enter the vehicle) and cargo including articles of perishable cargo or non-perishable cargo. Further, the one or more computing devices 110 can be configured to determine physical properties of the one or more objects including the mass, weight, volume, density, or shape of the one or more objects. The one or more computing devices 110 can compare values associated with the physical properties of the one or more objects, to a set of one or more values associated with the vehicle 104 including a set of compartment configuration values associated with the spatial relationships of compartment components including portions of the compartment that can have their location or orientation changed by a vehicle control system of the vehicle 104.

Figure 2:
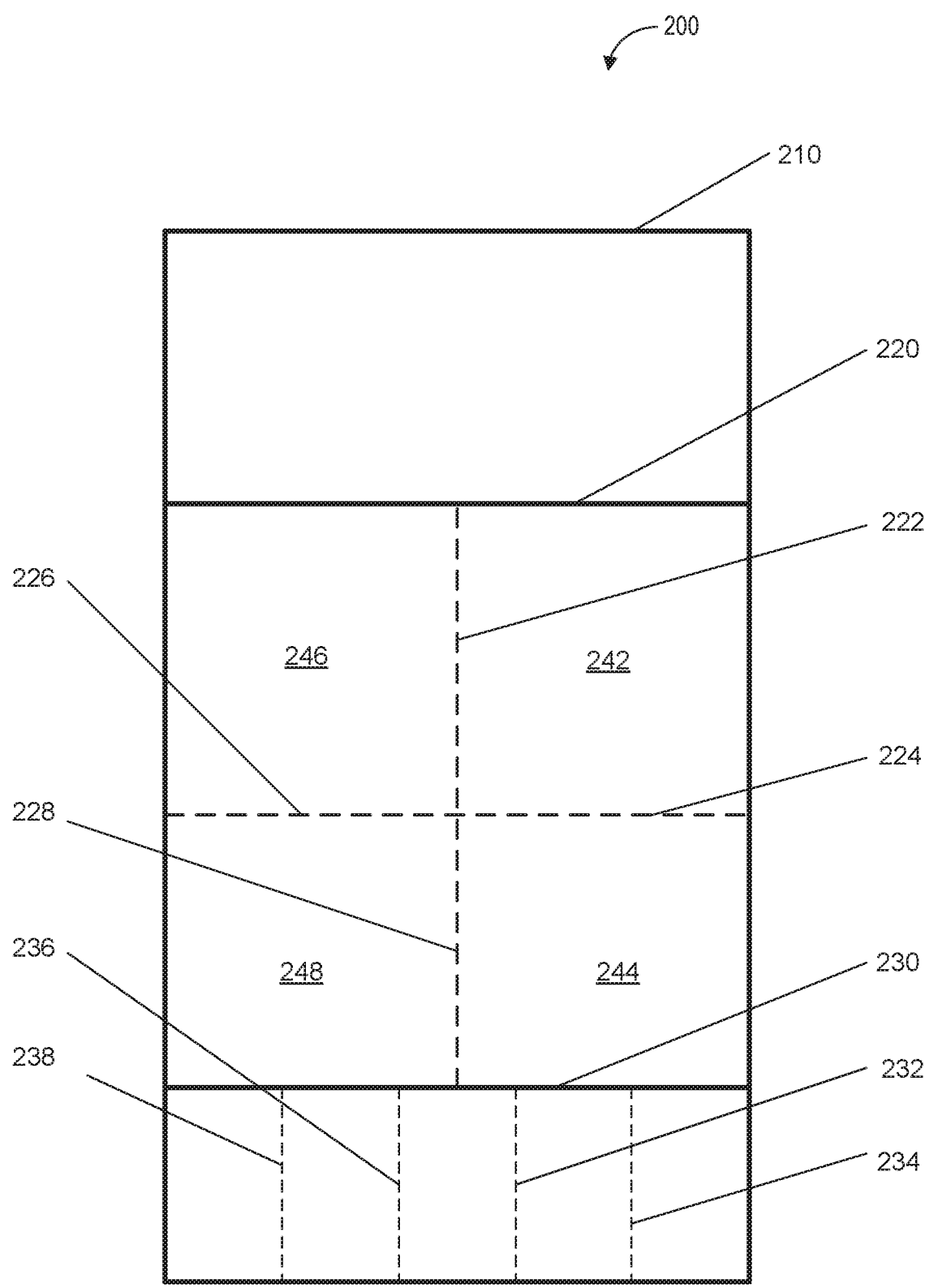
FIG. 2 depicts an example of an overhead view of a compartment configuration system according to example embodiments of the present disclosure.

FIG. 2 depicts a diagram of an environment 200 from a top down view, including an example of configurable compartments of a vehicle 210 according to example embodiments of the present disclosure. The environment 200 illustrates a vehicle 210; a compartment 220 that includes a compartment section 242/244/246/248 and a compartment component 222/224/226/228; and a compartment 230 that includes compartment component 232/234/236/238.

The vehicle 210 can include one or more sensors that can detect the presence, state, or condition of one or more objects (e.g., passengers and/or cargo) inside the vehicle 210 and/or external to the vehicle 210 including one or more objects that are in contact with a portion of the vehicle 210. For example, a combination of sensors including visual sensors (e.g., cameras and/or LIDAR) or audio sensors (e.g., microphones) can in conjunction with a computing system of the vehicle 210, detect and/or determine the state of the one or more objects (e.g., determine the size of objects within a threshold distance external to the vehicle 210). Further, the vehicle 210 can include one or more communications systems that can exchange (send or receive) one or more signals or data (e.g., occupancy data) with remote computing systems.

Any of the compartment component 222/224/226/228 in compartment 220 can be positioned or oriented in different ways to accommodate the one or more objects. Each of the compartment component 222/224/226/228 can be barriers (e.g., barriers composed of steel, plastic, wood, rubber, and/or glass) that can be raised or lowered to isolate the one or more objects in compartment 220 from one another. For example, by raising compartment component 222 and compartment component 224 cargo kept in compartment section 242 can be isolated from passengers seated in compartment section 244/246/248. In some implementations, the compartments can be assigned for use by certain types of objects including passengers and cargo. For example, the compartment 220 can be assigned for use by passengers and the compartment 230 can be assigned for use by cargo.

Figure 3:
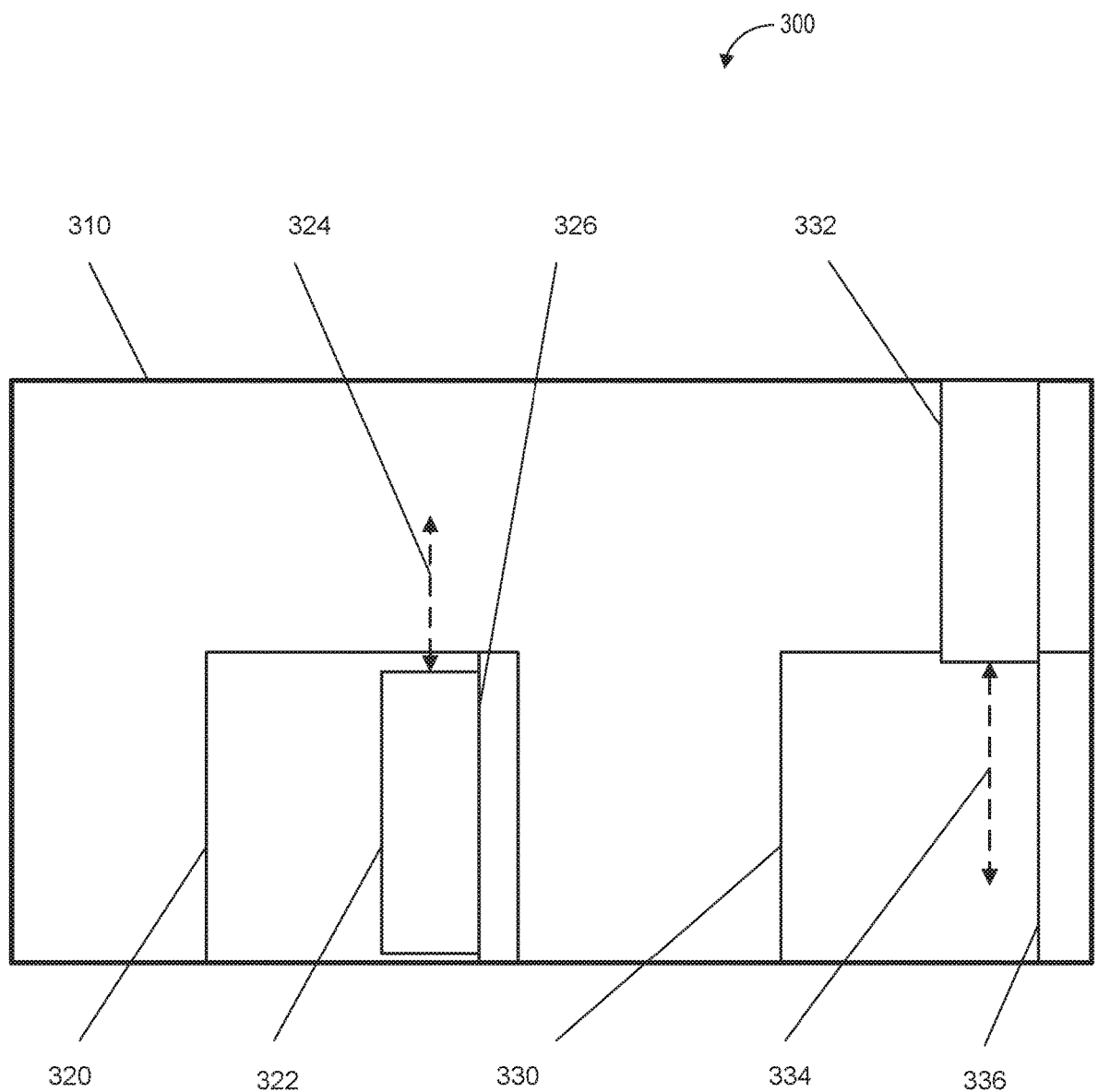
FIG. 3 depicts an example of cross-sectional view of a compartment configuration system according to example embodiments of the present disclosure.

FIG. 3 depicts a diagram of an environment 300 from a cross-sectional view, including an example of configurable compartments of a vehicle 310 according to example embodiments of the present disclosure. The environment 300 illustrates a vehicle 310; a compartment component 320; a compartment component 322; a component path 324; a component track 326; a compartment component 330; a compartment component 332; a component path 334; and a component track 336.

The vehicle 310 can include one or more sensors that can detect the presence, state, or condition of one or more objects (e.g., passengers and/or cargo) inside the vehicle 310 and/or external to the vehicle 310 including one or more objects that are in contact with a portion of the vehicle 310. For example, a combination of sensors including visual sensors (e.g., cameras and/or LIDAR) or audio sensors (e.g., microphones) can in conjunction with a computing system of the vehicle 310, detect and/or determine the state of the one or more objects (e.g., determine the size of objects within a threshold distance external to the vehicle 310). Further, the vehicle 310 can include one or more communications systems that can exchange (send or receive) one or more signals or data (e.g., occupancy data) with remote computing systems.

As shown, a compartment component 322 is in a retracted position within the compartment component 320. The compartment component 322 can be moved from the retracted position by a vehicle control system that controls motors in the component track 326 to which the compartment component 322 is attached. The component track 326 can move the compartment component 322 along the movement path 324. For example, in the retracted position the compartment component 322 can allow for larger objects to extend across different portions of the compartment that are inaccessible when the compartment component 322 is in an extended position.

As shown, a compartment component 332 is in an extended position within the compartment component 330. The compartment component 332 can be moved from the extended position by a vehicle control system that controls motors in the component track 336 to which the compartment component 332 is attached. The component track 336 can move the compartment component 332 along the movement path 334. For example, in the extended position the compartment component 332 can function as a seat back for a passenger or form a barrier between different sections of a compartment.

Figure 4:
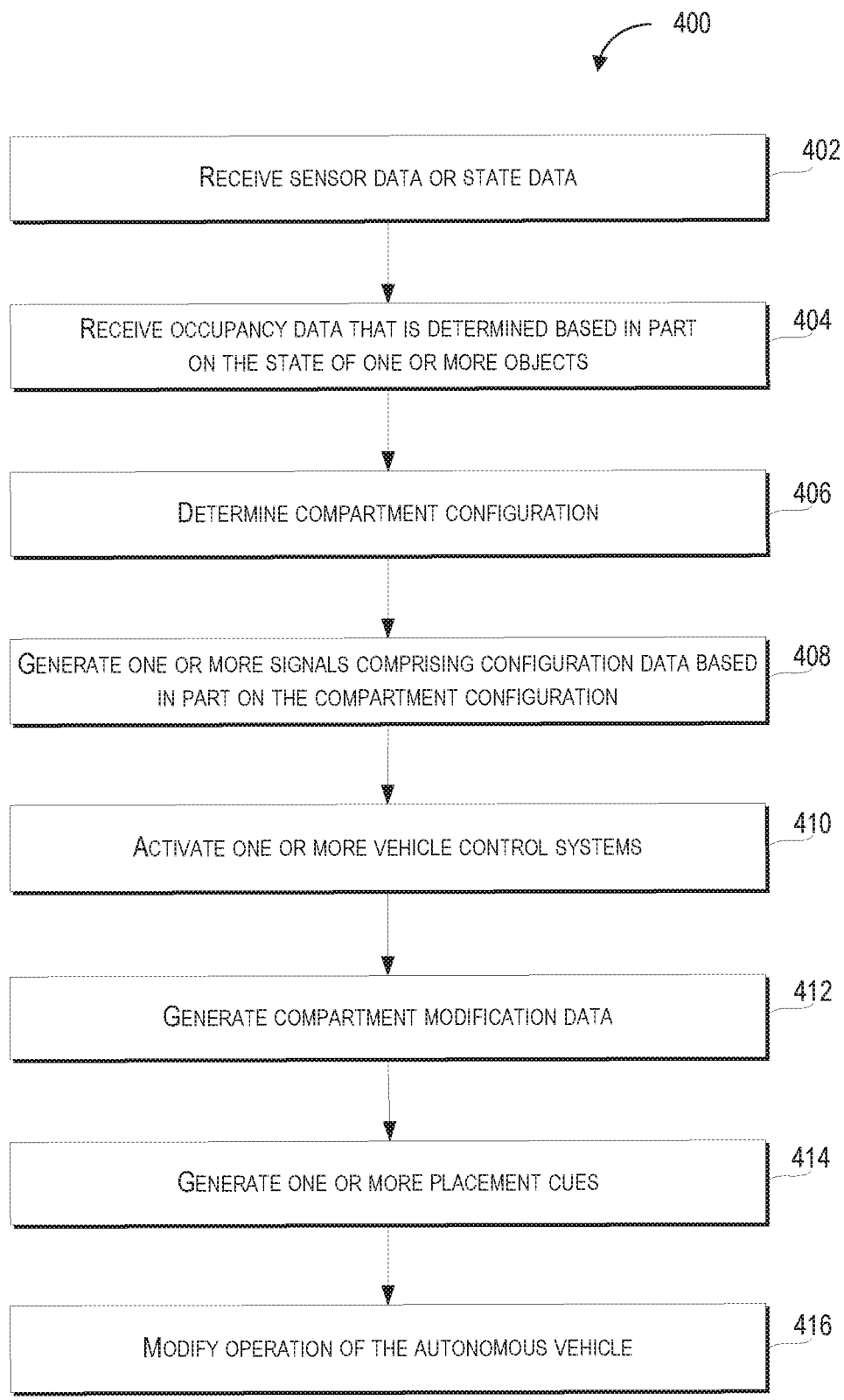
FIG. 4 depicts a flow diagram of an example method of operating a vehicle according to example embodiments of the present disclosure.

FIG. 4 depicts a flow diagram of an example method 400 of configuration of compartments of an autonomous vehicle according to example embodiments of the present disclosure. One or more portions of the method 400 can be implemented by one or more devices (e.g., one or more computing devices) or systems including, for example, the vehicle 104, the vehicle computing system 108, or the operations computing system 150, shown in FIG. 1. Moreover, one or more portions of the method 400 can be implemented as an algorithm on the hardware components of the devices described herein (e.g., as in FIG. 1) to, for example, determine a compartment configuration for an autonomous vehicle. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 402, the method 400 can include receiving sensor data from one or more sensors or state data from a remote computing system (e.g., one or more mobile computing devices, server computing devices, or client computing devices).

The sensor data or the state data can include one or more sensor signals based in part on the state or condition of the vehicle (e.g., the state of the one or more compartment components of the autonomous vehicle), the state or condition of one or more objects inside the vehicle (e.g., the state of passengers or cargo inside the vehicle), or the state or condition of an environment external to the vehicle, including the state or condition of one or more objects (e.g., passengers, cargo, and/or roadways). For example, the sensor data or the state data can include or be associated with one or more objects (e.g., passengers or cargo) including the number, physical state or characteristics (e.g., mass, weight, volume, size, shape, temperature, odor, and/or texture) of the one or more objects inside the vehicle, in one or more compartments attached to the vehicle, and/or within a threshold area around the vehicle (e.g., the state or condition of one or more objects within a ten meter radius of the vehicle).

In some implementations, the one or more sensors can be located on an exterior portion of the vehicle (e.g., on the hood, roof, door exteriors, and/or trunk exterior of the autonomous vehicle) or an interior of the vehicle (e.g., within the one or more compartments of the autonomous vehicle, the chassis of the autonomous vehicle, the door interiors, trunk interior, and/or the engine) and can include an optical sensor (e.g., a camera or LIDAR); an audio sensor (e.g., a microphone); a tactile sensor (e.g., a pressure sensor and/or a piezoresistive sensor); a temperature sensor (e.g., a thermometer); or an electromagnetic sensor (e.g., a capacitive sensor or piezoelectric sensor).

At 404, the method 400 can include receiving occupancy data that can be determined based in part on the state of one or more objects. The occupancy data can be received from one or more data sources including the vehicle (e.g., one or more sensors in the autonomous vehicle), one or more objects (e.g., cargo that includes a tracking and cargo information device) including objects inside the vehicle and/or external to the vehicle, or one or more remote computing devices (e.g., mobile computing devices including wearable devices). The occupancy data can be based in part on the one or more states, conditions, or characteristics of the one or more objects. The one or more states, conditions, or characteristics of the one or more objects can include a physical state, condition, or characteristic of the one or more objects (e.g., mass, weight, volume, size, shape, temperature, odor, and/or texture); or an identifying state, condition, or characteristic associated with the one or more objects including an object identifier (e.g., a passenger name or an identifying code associated with an article of cargo) or an object classification (e.g., classifying an a passenger as a child or an adult or classifying cargo as foodstuffs or a durable good).

In some implementations, the occupancy data can include, be associated with, or be determined based in part on the sensor data or the state data.

At 406, the method 400 can include determining a compartment configuration for one or more compartments of an autonomous vehicle. The compartment configuration can specify one or more spatial relations of one or more compartment components associated with the one or more compartments. The determination of the compartment configuration can be based in part on the occupancy data and/or compartment data. The compartment data can be based in part on a state of the one or more compartments. The one or more compartments can include one or more areas or enclosures that are inside the vehicle (e.g., passenger cabin, storage areas including a trunk or glovebox, and/or an engine area) and/or one or more areas that are outside the vehicle including areas that are attached to the vehicle (e.g., roof-racks, towed trailers). The state of the one or more compartments can include the state of the one or more compartment components associated with the one or more compartments and can include an indication of whether the one or more compartments are occupied, are scheduled to be occupied by the one or more objects, and the characteristics of the one or more compartments including a size (e.g., a mass, weight, volume, and/or length), shape, and carrying capacity (e.g., how much mass or weight a compartment can carry or hold) of the one or more compartments. For example, a determination of the state of the one or more compartments and the one or more objects can be based on the data provided by one or more sensors inside the vehicle.

The one or more spatial relations of the one or more compartment components can be based in part on, or include, spatial characteristics comprising a size (e.g., a mass, weight, volume, and/or length), a shape, a position, a location, or an orientation of the one or more compartment components. For example, the one or more spatial relations can specify an arrangement of the one or more compartment components with respect to a point of reference in the vehicle (e.g., the middle of the front axle of the vehicle).

At 408, the method 400 can include generating one or more configuration signals based in part on the compartment configuration to control the one or more compartments of the autonomous vehicle. The one or more configuration signals can include electronic signals or data that is associated with the compartment configuration. For example, the one or more configuration signals can include signals that are encoded to provide data that includes instructions based on the compartment configuration. Generating the one or more configuration signals can include transmitting the one or more configuration signals including wireless transmission through an antenna and/or wired transmission via an interconnection in the vehicle.

At 410, the method 400 can include activating one or more vehicle control systems to modify the one or more spatial relations of the one or more compartment components. Activation of the one or more vehicle control systems can be based in part on one or more signals including the one or more configuration signals. For example, the one or more configuration signals can be received by the one or more vehicle control systems (e.g., motors that control the one or more compartment components) and actuate the one or more vehicle control systems to perform one or more actions including moving the one or more compartment components based on the compartment configuration.

Activation of the one or more vehicle control components can include actuation of one or more motors (e.g., electrical motors) or engines (internal combustion engines) that can move the one or more compartment components in accordance with the compartment configuration. For example, actuation of one or more motors or engines can cause the one or more compartment components to undergo linear movement (e.g., moving a compartment component in a straight line along a compartment component track), rotary movement (e.g., spinning a compartment component), and/or oscillating movement (e.g., swinging a compartment component from a pivot point).

At 412, the method 400 can include generating, by the computing system, compartment modification data based in part on the one or more configuration signals. The compartment modification data can include one or more instructions for performing the one or more modifications to the one or more spatial relations of the one or more compartment components. For example, the compartment modification data can be associated with identity of the one or more compartment components that are being moved and the compartment configuration associated with the location or position of the one or more compartment components after being moved. In an implementation the compartment modification data can be sent (e.g., transmitted via a wired or wireless transmission of an electrical signal) to a remote computing device (e.g., a server computing device).

At 414, the method 400 can include generating one or more placement cues to indicate a location to place the one or more objects within the one or more compartments. The one or more placement cues can be based in part on the occupancy data or the compartment data. Based on the compartment configuration and the state of the one or more objects from the compartment data, the vehicle can provide one or more placement cues to facilitate the placement of the one or more objects (e.g., passengers or cargo) in the one or more compartments. For example, a notification system in the vehicle can provide audible instructions directing the passengers to seating locations that have been assigned to them.

The one or more placement cues can include visual cues (e.g., text or pictures to indicate where a passenger should sit or cargo should be placed), auditory cues (e.g., auditory instructions of where to place an article of cargo), or haptic cues (e.g., vibrating a seat in the vehicle to indicate that a passenger is not seated in the correct seat).

At 416, the method 400 can include modifying operation of the vehicle (e.g., the autonomous vehicle). The operation of the autonomous vehicle can be modified based in part on the one or more configuration signals. The modification of the operation of the autonomous vehicle can include activating one or more vehicle control systems to perform one or more actions including actions not associated with the one or more compartments or the one or more compartment components. For example, modification of the operation of the vehicle can include operation of a vehicle navigation system including a system that can determine the position of the vehicle and the location of one or more objects that are scheduled to be picked up or delivered; a vehicle access system including control over the entrances (e.g., windows and/or doors) to the vehicle; a vehicle communication system including one or more systems to exchange (send or receive) signals or data with remote computing devices (e.g., server computing devices and/or client computing devices); a vehicle suspension system (e.g., a system that controls the springs, shock absorbers, and other damping systems of the vehicle); a vehicle propulsion system including one or more engine or motors that cause the vehicle to move from one location to another location; and/or a vehicle notification system (e.g., a system that provides visual, auditory, or haptic notifications to one or more passengers of the vehicle).

In an implementation, modifying operation of the autonomous vehicle can include modifying a velocity of the autonomous vehicle, an acceleration of the autonomous vehicle, a deceleration of the autonomous vehicle, or a path of the autonomous vehicle.

Figure 5:
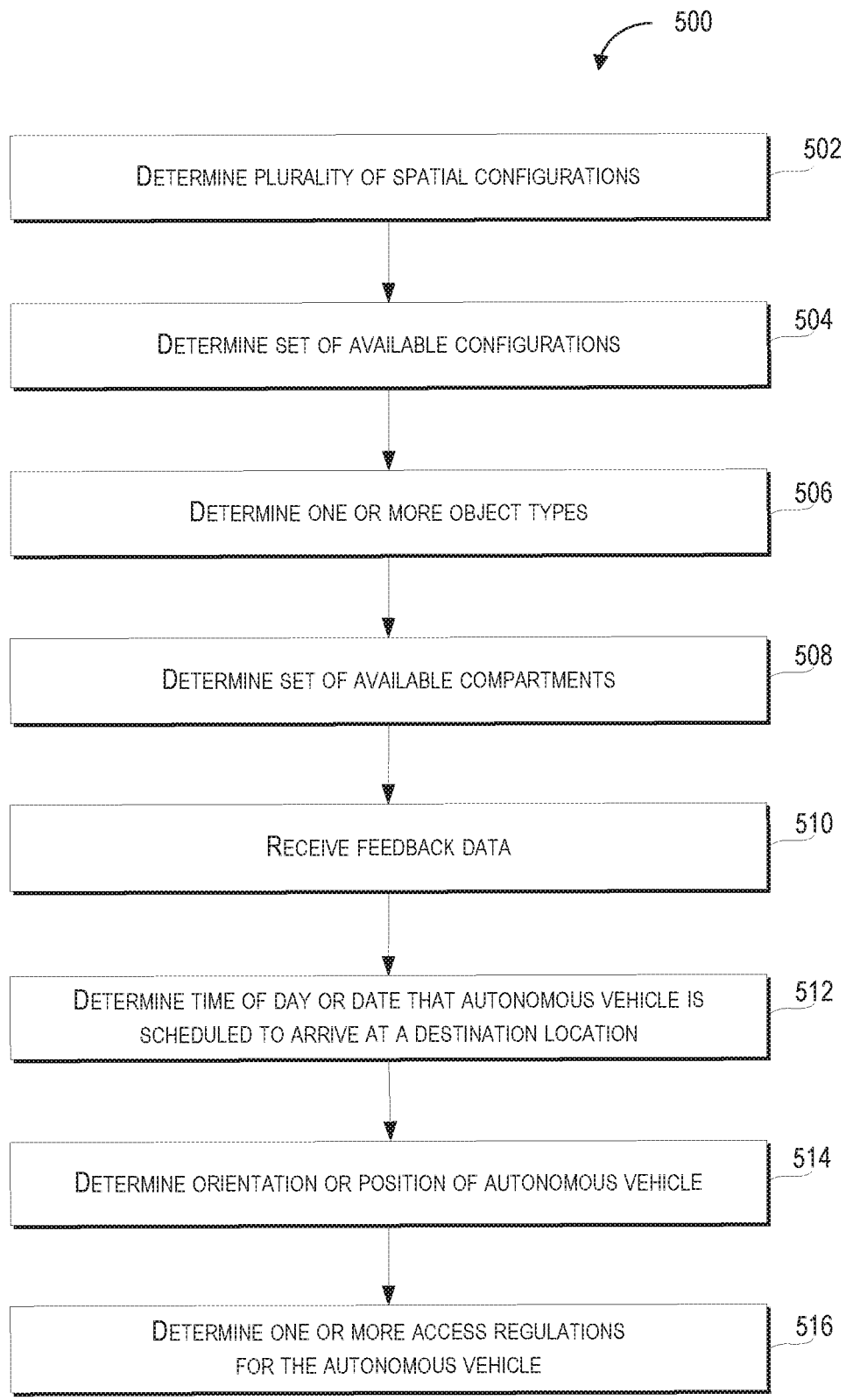
FIG. 5 depicts a flow diagram of an example method for generating compartment data associated with operation of a vehicle according to example embodiments of the present disclosure.

FIG. 5 depicts a flow diagram of an example method 500 of configuration of compartments of an autonomous vehicle according to example embodiments of the present disclosure. One or more portions of the method 500 can be implemented by one or more devices (e.g., one or more computing devices) or systems (e.g., a vehicle control system) including, for example, the vehicle 104, the vehicle computing system 108, or the operations computing system 150, shown in FIG. 1. Moreover, one or more portions of the method 500 can be implemented as an algorithm on the hardware components of the devices described herein (e.g., as in FIG. 1) to, for example, determine a compartment configuration for an autonomous vehicle. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include determining a plurality of spatial configurations of the one or more objects with respect to the one or more compartments. The plurality of spatial configurations can be based in part on the occupancy data (e.g., data associated with the state of one or more objects including passengers and/or cargo) and/or the compartment data (e.g., data associated with the state of the one or more compartments of the vehicle). The plurality of spatial configurations can be determined based in part on various factors including comparisons between the dimensions of cargo and the dimensions of the one or more compartments using different configurations of the one or more compartment components. For example, a vehicle with two compartments and a single compartment component that forms a barrier between the two compartments and can be moved to increase the available area of one compartment by an amount that is directly proportional to the decrease in available area of the other compartment. In this example, to accommodate both a large item (e.g., a miniature refrigerator) and a small item (e.g., a laptop computer), the single compartment component can be positioned according to multiple spatial configurations in which one compartment is configured to be larger (to accommodate the miniature refrigerator) and the other compartment is configured to be smaller to accommodate the laptop computer.

In another example, a plurality of spatial configurations can be determined based on the maximum size of an object that a compartment can hold, such that larger objects are assigned to larger compartments that can accommodate those objects and smaller objects are assigned to smaller compartments so that shifting of the object during transit can be minimized.

At 504, the method 500 can include determining a set of available configurations based in part on the plurality of spatial configurations that satisfy one or more compartment criteria associated with a location or position of the one or more objects within the one or more compartments. The one or more compartment criteria can include criteria based in part on the physical dimensions (e.g., height, width, depth, mass, weight, and/or volume) of the one or more objects and the one or more compartments (e.g., a maximum volume, length, or mass of an object that a compartment can accommodate in order to be determined to be available). The set of available configurations can include the configurations of the one or more compartments that satisfy the one or more compartment criteria (e.g., a compartment is large enough to accommodate an object of a particular size).

In an implementation, the compartment data can include the set of available configurations. For example, based on the one or more compartments that are occupied, the available space in the one or more compartments, and/or the size (e.g., physical dimensions) or type (e.g., passenger or cargo) of the one or more objects, a set of available configurations can be determined. In this way, determination of the compartment configuration can be performed more efficiently by focusing computational resources on the available configurations.

The vehicle control system can determine a set of available configurations that is based in part on the plurality of spatial configurations that satisfy one or more compartment criteria associated with a location or position of the one or more objects within the one or more compartments (e.g., passengers seated within the passenger compartment and/or cargo stored in a storage compartment). The one or more compartment criteria can include criteria associated with various properties of the one or more objects in relation to the one or more compartments including maximum allowable dimensions (e.g., a maximum length of an object that a compartment can contain) and maximum mass capacity (e.g., a maximum mass of an object that a compartment can carry or contain).

At 506, the method 500 can include determining, based in part on the occupancy data, one or more object types for the one or more objects, the one or more object types comprising passengers, perishable cargo, non-perishable cargo, or durable cargo; and The determination of the one or more object types can be performed using any combination of output from the one or more sensors (e.g., object recognition of cargo based on output from a bar code reader), one or more vehicle computing systems (e.g., an indication of a passenger identity determined through a near field communication device), and/or data received from a remote computing device (e.g., an indication of passenger identity received from a remote server computing device). The one or more object types can be based on various states, features, conditions, or characteristics of the one or more objects and can include passengers (e.g., individuals inside a passenger compartment of the vehicle), perishable cargo (e.g., cargo including hot foodstuffs that will rapidly cool and become unpalatable with a pre-determined period of time), non-perishable cargo (e.g., cargo, such as bottled water that will not rapidly spoil or decay when stored outside of a naturally cold or refrigerated environment for a pre-determined period of time), and/or durable cargo (e.g., cargo, such as sporting equipment that can be stored for years without spoiling).

At 508, the method 500 can include determining a set of available compartments that can include the one or more compartments that satisfy one or more compartment criteria associated with the one or more object types. The one or more compartment criteria can include a requirement that one or more objects types can be placed in one or more compartments or that one or more object types cannot be placed in one or more compartments. For example, a compartment can be for exclusive use by cargo (e.g., a trunk compartment of the vehicle) and the compartment criteria would be that passengers are restricted from being seated in the trunk. In another example a compartment criteria can specify that when a parent and child travel together, their seating compartments are adjacent so that the parent can monitor and assist the child.

In an implementation, the compartment data can include the set of available compartments. For example, the compartment data can include the set of compartments that are available to carry heavy items (e.g., cargo that exceeds a mass threshold) or the set of compartments that are available to passengers (e.g., passenger compartments) and to cargo (e.g., passenger compartments and storage areas including a trunk and/or glove box).

At 510, the method 500 can include receiving feedback data associated with the one or more compartments. The feedback data can be associated with a state or condition of the one or more compartments including an indication of an adverse effect on the operation of the one or more compartments or the autonomous vehicle and/or an indication of an amelioration of an improperly operating compartment. For example, a thermometer associated with a temperature monitoring system in a refrigerated article of cargo can provide feedback in the form of a temperature of the article of cargo. In the example of a food item that is meant to be kept cold (e.g., ice cream) the temperature monitoring system can provide temperature feedback of the food item so that the temperature of the ice-cream rising above a certain temperature threshold (e.g., the freezing point of water) can indicate that the compartment is malfunctioning (i.e., not properly maintaining the temperature below the temperature threshold).

Further, in some instances a passenger can provide feedback data by modifying the operation of a compartment that is not functioning within a specified set of operational parameters (e.g., a passenger can adjust the temperature control of a refrigerated compartment so that the compartment is colder).

In an implementation, the compartment data can include the feedback data. Accordingly, the feedback data can be used to adjust properties of the compartment data including the available compartment configurations (e.g., a compartment may not be available due to feedback data indicating that the compartment is not operating properly).

At 512, the method can include determining a time of day (e.g., at 12:30 p.m.) or date (August twenty-fourth of the current year) that the autonomous vehicle is scheduled to arrive at a destination location (e.g., a location specified by a latitude and longitude). The time of day or date can be based on an estimate of the time it will take for the vehicle to travel to the destination location from the current location. The estimate of the travel time for the vehicle can be based on navigational data that indicates the distance to the destination location from the current location of the vehicle and traffic data that indicates the level of traffic on the route to the destination location. Further, the scheduled time of day or date for the vehicle to arrive at the destination location can be based on scheduling data (e.g., a scheduled arrival time for the vehicle sent from a vehicle dispatch center) that is received by the vehicle.

At 514, the method 500 can include determining, based in part on navigation data, an orientation or position of the autonomous vehicle at the destination location, the navigation data including traffic flow patterns associated with an area including the destination location.

Based on data including map data or navigation data (e.g., data including a map of a geographic area, geographic coordinates of the area, and directions to the destination location), an orientation (e.g., the direction in which the vehicle is aligned relative to its surrounding environment including a destination location and/or the prevailing direction of traffic at the destination location) or position (e.g., a latitude and longitude) of the autonomous vehicle at the destination location can be determined. For example, the vehicle can be determined to arrive at a pick-up location (i.e., destination location) at 1:00 p.m. and park (i.e., stop the vehicle for a predetermined period of time) at a specific location based on the amount of traffic between the current location and the destination location and the parking regulations (e.g., allowed and prohibited parking areas) at the destination location.

In some implementations, the compartment data can be based in part on, or include, the orientation or position of the autonomous vehicle at a destination location (e.g., a location at which the autonomous vehicle will pick-up or drop-off one or more objects).

At 516, the method 500 can include determining, based in part on the occupancy data, one or more access regulations for the one or more compartments. The one or more access regulations can include contact limitations (e.g., objects that are restricted from coming into contact with one another) or minimum proximity distances (e.g., a minimum distance that is to be maintained between two or more objects) associated with the one or more objects.

For example, the one or more access regulations can include an access regulation limiting contact between certain types of cargo (e.g., a minimum distance or an insulating barrier between cold food and hot food). The vehicle can then implement the compartment configuration by modifying the position of a compartment component to increase the distance between the different types of cargo (e.g., the cold food and hot food are placed in non-adjacent compartments).

In some implementations, the compartment data can be based in part on one or more access regulations of the one or more compartments. In this way, the access regulations can be used to limit the types of compartment configurations that are available for use by the one or more objects.

Figure 6:
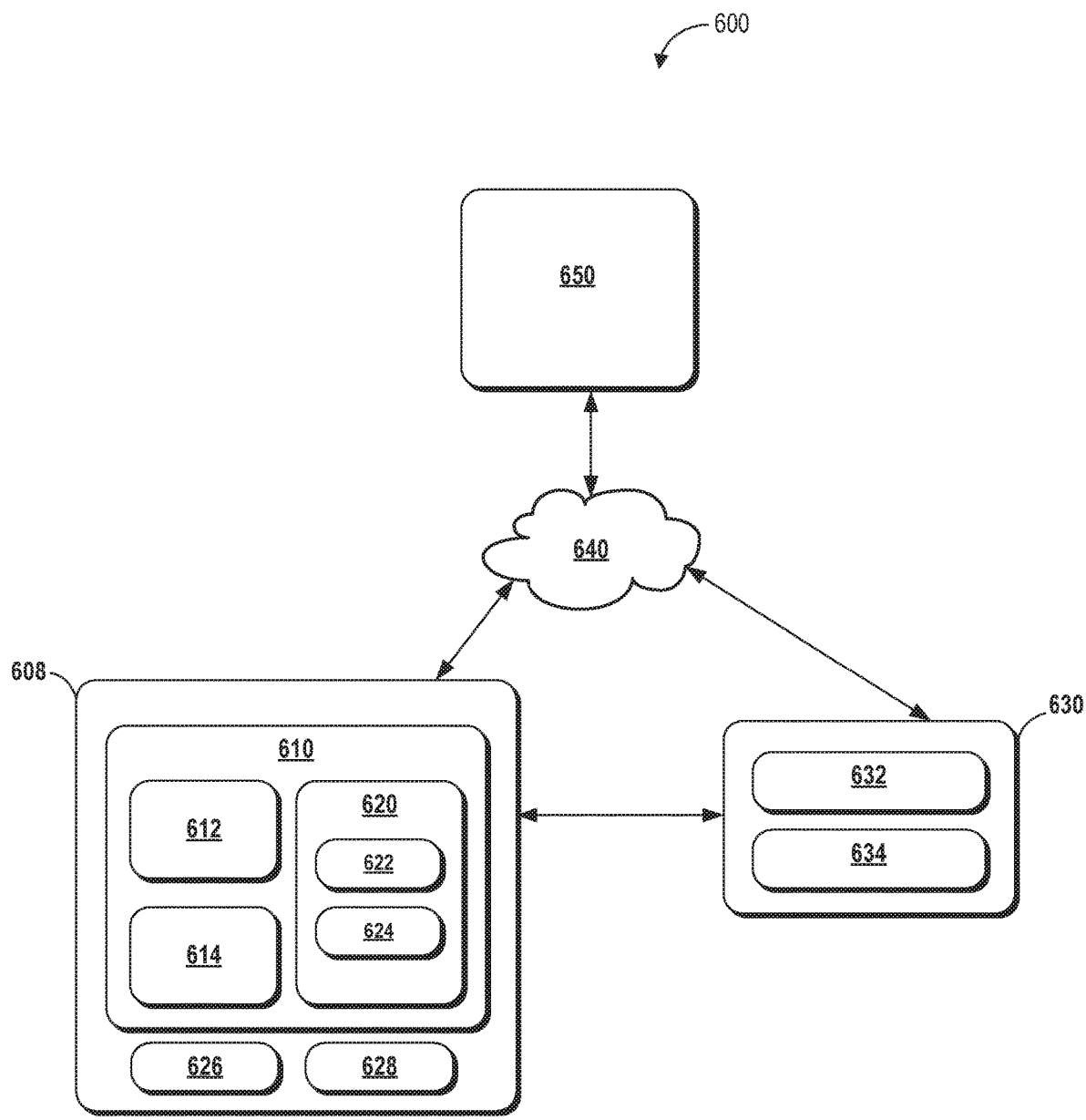
FIG. 6 depicts a diagram of an example system according to example embodiments of the present disclosure.

FIG. 6 depicts an example system 600 according to example embodiments of the present disclosure. The system 600 can include a vehicle computing system 608 which can include some or all of the features of the vehicle computing system 108 depicted in FIG. 1; one or more computing devices 610 which can include some or all of the features of the one or more computing devices 110; a communication interface 612; one or more processors 614; one or more memory devices 620; memory system 622; memory system 624; one or more input devices 626; one or more output devices 628; one or more computing devices 630 which can include some or all of the features of the one or more computing devices 130 depicted in FIG. 1; one or more input devices 632; one or more output devices 634; a network 640 which can include some or all of the features of the network 140 depicted in FIG. 1; and an operations computing system 650 which can include some or all of the features of the operations computing system 150 depicted in FIG. 1.

The vehicle computing system 608 can include the one or more computing devices 610. The one or more computing devices 610 can include one or more processors 614 which can be included on-board a vehicle including the vehicle 104 and one or more memory devices 620 which can be included on-board a vehicle including the vehicle 104. The one or more processors 614 can be any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 614 can include a single processor or a plurality of processors that are operatively and/or selectively connected. The one or more memory devices 620 can include one or more non-transitory computer-readable storage media, such as RAM, ROM, EEPROM, EPROM, flash memory devices, magnetic disks, and/or combinations thereof.

The one or more memory devices 620 can store data or information that can be accessed by the one or more processors 614. For instance, the one or more memory devices 620 which can be included on-board a vehicle including the vehicle 104, can include a memory system 622 that can store computer-readable instructions that can be executed by the one or more processors 614. The memory system 622 can include software written in any suitable programming language that can be implemented in hardware (e.g., computing hardware). Further, the memory system 622 can include instructions that can be executed in logically and/or virtually separate threads on the one or more processors 614. The memory system 622 can include any set of instructions that when executed by the one or more processors 614 cause the one or more processors 614 to perform operations.

For example, the one or more memory devices 620 which can be included on-board a vehicle including the vehicle 104 can store instructions, including specialized instructions, that when executed by the one or more processors 614 on-board the vehicle cause the one or more processors 614 to perform operations such as any of the operations and functions of the one or more computing devices 610 or for which the one or more computing devices 610 are configured, as described herein, the operations for receiving data (e.g., occupancy data or compartment data), determining one or more compartment configurations of the vehicle, and generating one or more configuration signals (e.g., one or more portions of method 400 or method 500), or any other operations or functions for configuration of a compartment of a vehicle, as described herein.

The one or more memory devices 620 can include a memory system 624 that can store data that can be retrieved, manipulated, created, and/or stored by the one or more computing devices 610. The data stored in memory system 624 can include, for instance, data associated with a vehicle including the vehicle 104, data acquired by the one or more data acquisition systems 112, map data, data associated with a vehicle compartment configuration, data associated with user input, data associated with one or more actions and/or control command signals, data associated with users, and/or other data or information. The data in the memory system 624 can be stored in one or more databases. The one or more databases can be split up so that they are located in multiple locales on-board a vehicle which can include the vehicle 104. In some implementations, the one or more computing devices 610 can obtain data from one or more memory devices that are remote from a vehicle, which can include the vehicle 104.

The environment 600 can include the network 640 (e.g., a communications network) which can be used to exchange (send or receive) signals (e.g., electronic signals) or data (e.g., data from a computing device) including signals or data exchanged between computing devices including the operations computing system 650, the vehicle computing system 608, or the one or more computing devices 630. The network 640 can include any combination of various wired (e.g., twisted pair cable) and/or wireless communication mechanisms (e.g., cellular, wireless, satellite, microwave, and radio frequency) and/or any desired network topology (or topologies). For example, the communications network 140 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 104.

The one or more computing devices 610 can also include communication interface 612 used to communicate with one or more other systems which can be included on-board a vehicle including the vehicle 104 (e.g., over the network 640. The communication interface 612 can include any suitable components for interfacing with one or more networks, including for example, transmitters, receivers, ports, controllers, antennas, or other suitable hardware and/or software.

The vehicle computing system 608 can also include one or more input devices 626 and/or one or more output devices 628. The one or more input devices 626 and/or the one or more output devices 628 can be included and/or otherwise associated with a human-machine interface system. The one or more input devices 626 can include, for example, hardware for receiving information from a user, such as a touch screen, touch pad, mouse, data entry keys, speakers, and/or a microphone suitable for voice recognition. The one or more output devices 628 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 104 via at least one of the display devices and the audio output devices.

The one or more computing devices 630 can include various types of computing devices. For example, the one or more computing devices 630 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more computing devices 630 can be associated with a user (e.g., 136). The one or more computing devices 630 described herein can also be representative of a user device that can be included in the human machine interface system of a vehicle including the vehicle 104.

The one or more computing devices 630 can include one or more input devices 632 and/or one or more output devices 634. The one or more input devices 632 can include, for example, hardware for receiving information from a user, such as a touch screen, touch pad, mouse, data entry keys, speakers, and/or a microphone suitable for voice recognition. The one or more output devices 634 can include hardware for providing content for display. For example, the one or more output devices 634 can include a display device (e.g., display screen, CRT, LCD), which can include hardware for a user interface.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of operating an autonomous vehicle, the computer-implemented method comprising:
   receiving, by a computing system comprising one or more computing devices, occupancy data indicating a type of one or more objects to occupy an autonomous vehicle;
   determining, by the computing system, based in part on the occupancy data and compartment data, a compartment configuration for one or more compartments of the autonomous vehicle, the compartment data indicating a state of the one or more compartments, wherein the compartment configuration specifies one or more spatial arrangements of the one or more compartments; and
   generating, by the computing system, one or more configuration signals based in part on the compartment configuration to adjust the one or more compartments of the autonomous vehicle.

2. The computer-implemented method of claim 1, wherein the occupancy data comprises information associated with physical dimensions of the one or more objects and further comprising:
   activating, by the computing system, based in part on the one or more configuration signals, one or more vehicle control systems to modify positions of the one or more compartment components to accommodate the physical dimensions of the one or more objects.

3. The computer-implemented method of claim 1, further comprising:
   generating, by the computing system, compartment modification data based in part on the one or more configuration signals, wherein the compartment modification data comprises one or more instructions for performing one or more modifications to the one or more spatial arrangements of the one or more compartment components; and
   sending, by the computing system, the compartment modification data to a remote computing device.

4. The computer-implemented method of claim 1, further comprising:
   determining, by the computing system, a plurality of spatial configurations of the one or more objects with respect to the one or more compartments; and
   determining, by the computing system, a set of available configurations based in part on the plurality of spatial configurations that satisfy one or more compartment criteria associated with a location or a position of the one or more objects within the one or more compartments, wherein the compartment data comprises the set of available configurations.

5. The computer-implemented method of claim 1, further comprising:
   determining, by the computing system, a set of available compartments comprising the one or more compartments that satisfy one or more compartment criteria associated with the type of the one or more objects, wherein the compartment data comprises the set of available compartments.

6. The computer-implemented method of claim 1, further comprising:
   receiving, by the computing system, feedback data associated with the one or more compartments, wherein the feedback data comprises an indication of an adverse effect on the operation of the one or more compartments or the autonomous vehicle, wherein the compartment data comprises the feedback data.

7. The computer-implemented method of claim 1, further comprising:
   determining, by the computing system, a time of day or a date that the autonomous vehicle is scheduled to arrive at a destination location; and
   determining, by the computing system, and based on navigation data, an orientation or a position of the autonomous vehicle at the destination location, the navigation data including a traffic flow pattern associated with an area including the destination location, wherein the compartment data comprises the orientation or the position of the autonomous vehicle at the destination location.

8. The computer-implemented method of claim 1, further comprising:
   determining, by the computing system, and based in part on the occupancy data, one or more access regulations for the one or more compartments, the one or more access regulations comprising a contact limitation or a minimum proximity distance associated with the one or more objects, wherein the compartment data comprises the one or more access regulations.

9. The computer-implemented method of claim 1, wherein the one or more spatial arrangements of the one or more compartment components are based in part on spatial characteristics comprising a size, a shape, a position, a location, or an orientation of the one or more compartment components.

10. The computer-implemented method of claim 1, further comprising:
receiving, by the computing system, sensor data from one or more sensors or state data from a remote computing system, the sensor data or the state data comprising a mass, a weight, a volume, a size, a shape, a temperature, an odor, or a texture of the one or more objects, wherein the occupancy data is based in part on the sensor data or the state data.

11. The computer-implemented method of claim 1, further comprising:
generating, by the computing system, and based in part on the occupancy data or the compartment data, one or more placement cues to indicate a location to place the one or more objects within the one or more compartments, wherein the one or more placement cues comprise visual cues, auditory cues, or haptic cues.

12. The computer-implemented method of claim 1, further comprising:
modifying, by the computing system, operation of the autonomous vehicle based in part on the one or more configuration signals, wherein the modifying operation of the autonomous vehicle comprises modifying a velocity of the autonomous vehicle, an acceleration of the autonomous vehicle, a deceleration of the autonomous vehicle, or a path of the autonomous vehicle.

13. One or more tangible, non-transitory computer-readable media storing computer-readable instructions that when executed by one or more processors cause the one or more processors to perform operations, the operations comprising:
receiving occupancy data indicating a type of one or more objects to occupy an autonomous vehicle;
determining, based in part on the occupancy data and compartment data, a compartment configuration for one or more compartments of the autonomous vehicle, the compartment data indicating a state of the one or more compartments, wherein the compartment configuration specifies one or more spatial arrangements of the one or more compartments; and
generating one or more configuration signals based in part on the compartment configuration to adjust the one or more compartments of the autonomous vehicle.

14. The one or more tangible, non-transitory computer-readable media of claim 13, further comprising:
activating, based in part on the one or more configuration signals, one or more vehicle control systems to modify a location or an orientation of the one or more compartment components.

15. The one or more tangible, non-transitory computer-readable media of claim 13, further comprising:
determining a set of available compartments comprising the one or more compartments that satisfy one or more compartment criteria associated with the type of the one or more objects, wherein the compartment data comprises the set of available compartments.

16. The one or more tangible, non-transitory computer-readable media of claim 13, further comprising:
determining a time of day or a date that the autonomous vehicle is scheduled to arrive at a destination location; and
determining, based on navigation data, an orientation or a position of the autonomous vehicle at the destination location, the navigation data including a traffic flow pattern associated with an area including the destination location, wherein the compartment data is based in part on the orientation or the position of the autonomous vehicle at the destination location.

17. A computing system comprising:
one or more processors;
a memory comprising one or more computer-readable media, the memory storing computer-readable instructions that when executed by the one or more processors cause the one or more processors to perform operations comprising:
receiving occupancy data indicating a type of one or more objects to occupy an autonomous vehicle;
determining, based in part on the occupancy data and compartment data, a compartment configuration for one or more compartments of the autonomous vehicle, the compartment data indicating a state of the one or more compartments, wherein the compartment configuration specifies one or more spatial arrangements of the one or more compartments; and
generating one or more configuration signals based in part on the compartment configuration to adjust the one or more compartments of the autonomous vehicle.

18. The computing system of claim 17, further comprising:
activating, based in part on the one or more configuration signals, one or more vehicle control systems to modify a location or an orientation of the one or more compartment components.

19. The computing system of claim 17, further comprising:
determining a set of available compartments comprising the one or more compartments that satisfy one or more compartment criteria associated with the type of the one or more objects, wherein the compartment data comprises the set of available compartments.

20. The computing system of claim 17, further comprising:
determining a time of day or a date that the autonomous vehicle is scheduled to arrive at a destination location; and
determining, based on navigation data, an orientation or a position of the autonomous vehicle at the destination location, the navigation data including a traffic flow pattern associated with an area including the destination location, wherein the compartment data comprises the orientation or the position of the autonomous vehicle at the destination location.

* * * * *